United States Patent [19]

Chao et al.

[11] Patent Number: 4,956,329
[45] Date of Patent: Sep. 11, 1990

[54] HIGH SURFACE AREA CORDIERITE CATALYST SUPPORT STRUCTURES

[75] Inventors: Tai-Hsiang Chao, Mt. Prospect; Michael W. Schoonover, Arlington Heights; Gerald T. Stranford, Palatine, all of Ill.

[73] Assignee: Allied-Signal Inc., Morris Township, Morris County, N.J.

[21] Appl. No.: 276,610

[22] Filed: Nov. 28, 1988

[51] Int. Cl.⁵ .......................... B01J 21/00; B01J 32/00
[52] U.S. Cl. .................... 502/251; 502/235; 502/439
[58] Field of Search ................... 502/235, 251, 439

[56] References Cited

U.S. PATENT DOCUMENTS

| | | | |
|---|---|---|---|
| 2,540,689 | 2/1951 | Porret | 502/235 |
| 2,935,483 | 5/1960 | Schwartz | 502/235 |
| 3,390,100 | 6/1968 | Chomitz et al. | 502/251 |
| 3,615,187 | 10/1971 | Suzukawa et al. | 502/251 |
| 3,894,968 | 7/1975 | Berger et al. | 502/251 |
| 4,253,992 | 3/1981 | Soejima et al. | 502/251 |
| 4,631,267 | 12/1986 | Lachman et al. | 502/439 |
| 4,637,995 | 1/1987 | DeAngelis | 502/439 |
| 4,657,880 | 4/1987 | Lachman | 502/64 |
| 4,747,986 | 5/1988 | Chao | 264/177.11 |

FOREIGN PATENT DOCUMENTS 111843  8/1980  Japan .................... 502/251

OTHER PUBLICATIONS

"Synthesis of Oxide Ceramic Powders by Aqueous Coprecipitation" J. R. Moyer et al., Materials Research Society Symposium, vol. 73, p. 117 (1986).

Primary Examiner—Carl F. Dees
Attorney, Agent, or Firm—Frank S. Molinaro; Harold N. Wells; Roger H. Criss

[57] ABSTRACT

This invention relates to a catalyst support structure, methods of preparing the support structure and a process for using the support structure. The catalyst support structure is composed of a substantially polycrystalline cordierite phase having a chemical composition by weight of 6–15% MgO, 33–40% $Al_2O_3$ and 45–56% $SiO_2$ and characterized in that it has a surface area of at least 2.7 $m^2/g$ and preferably 8 $m^2/g$, a compressive strength of at least 31 MPa, a thermal expansion coefficient smaller than $5.2 \times 10^{-6}$ m/m/°C. and a porosity of at least 20%.

26 Claims, No Drawings

HIGH SURFACE AREA CORDIERITE CATALYST SUPPORT STRUCTURES

BACKGROUND OF THE INVENTION

Catalysts are employed in a number of processes ranging from refining crude oil to treating waste streams. These catalysts usually contain one or more catalytic metals deposited on a support which has a high surface area and high porosity. These support properties are necessary in order to have a catalyst with high activity and good durability. The support is generally a refractory inorganic oxide which may be utilized in a number of configurations, shapes and sizes. For example the support may be formed in the shape of spheres, extrudates, irregularly shaped granules, etc. or the support may be deposited as a layer onto a rigid structure such as a metal or ceramic honeycomb structure.

The use of a honeycomb structure has been the preferred configuration in treating exhaust gases, e.g., from automotive engines, because it reduces the weight of the catalyst and minimizes the amount of back pressure on the engine. Typically, a honeycomb structure composed of a polycrystalline cordierite phase which has a surface area less than 1 $m^2/g$ is used. Cordierite is used because of its good strength and thermal shock resistance. However, treating an exhaust stream with a catalyst consisting of a cordierite monolithic structure which has been coated with a support containing catalytic metals does have some drawbacks. One drawback is that the thermal expansion coefficient of cordierite is different than that of the support. Therefore, during thermal cycling some of the support, which contains the catalytic metals, can flake off and be carried off in the exhaust stream. This deteriorates the activity of the catalyst. The exhaust gases also contain dust or particulate matter which can also cause the high surface area support to flake off and be carried off. These problems could be eliminated if the monolithic structure had a high surface area such that the catalytic metals could be deposited on the honeycomb structure without using a support. Eliminating the support coating would also represent an economic advantage because a processing step would be eliminated.

This problem has received attention in the art and some solutions have been proposed. However, the solutions have centered on adding a high surface area porous oxide phase to the ceramic phase, e.g., cordierite. For example, U.S. Pat. No. 4,631,268 to Lachman et al. discloses a monolithic structure having a substantially continuous high strength ceramic phase selected from the group consisting of cordierite, mullite, clay, talc, zirconia, zirconia-spinel, alumina, silica, lithium aluminosilicates, alumina-zirconia and mixtures thereof and a discontinuous high surface area porous phase selected from alumina, silica, spinel, titania, zirconia, zeolite, and mixtures thereof.

U.S. Pat. Nos. 4,657,880 and 4,637,995 disclose similar materials with minor modifications. In all three of these patents, the high surface area is contributed by a porous oxide. Additionally, U.S. Pat. No. 4,631,267 discloses a high surface area monolithic structure composed of a high surface area porous oxide phase and a permanent binder. The porous oxide phase is selected from the group consisting of alumina, silica, zeolite, and spinels. The above patents disclose and claim that the resulting monolithic structures can be used as catalyst supports without the use of a separate support layer deposited on the monolithic structure.

In contrast to the solutions provided by the prior art, applicants' solution to the problem is a catalyst support structure comprising a substantially polycrystalline cordierite phase having a surface area of at least 2.7 $m^2/g$ and preferably at least 8 $m^2/g$. Applicants are the first to produce a high surface area cordierite catalyst support structure. There is nothing in any of the above cited references that even hints that a high surface area cordierite monolithic structure can be formed.

The instant application also relates to a method of producing a high surface area catalyst support structure. This process involves coprecipitating aluminum, magnesium and silicon compounds, followed by extrusion through a die to form a desired shape and heating the shape to form a high surface area cordierite catalyst support structure.

The prior art does not disclose that a high surface area catalyst support structure can be produced by the method described above. The closest prior art shows that a high density, low surface area (opposite properties of applicants' product) can be prepared by coprecipitating aluminum, magnesium and silicon compounds, forming the powder into a shape and sintering at high temperatures. Such a procedure is described in "Synthesis of Oxide Ceramic Powders by Aqueous Coprecipitation" by J. R. Moyer et al., Materials Research Society Symposium, Vol. 73, p. 117 (1986). The aim of the synthesis in the Moyer reference is to form ceramic products which have a density of about 98% of its theoretical density, whereas applicants' product has at least 20% porosity (low density). Thus, the Moyer reference neither suggests nor hints at a method of producing a high surface area catalyst support structure. It is applicants alone who have discovered such a method.

SUMMARY OF THE INVENTION

This invention relates to a catalyst support structure, methods of preparing said catalyst support structure and a use for said structure. The catalyst support structure comprises a substantially polycrystalline cordierite phase having a chemical composition by weight of 6–15% MgO, 33–40% $Al_2O_3$ and 45–56% $SiO_2$, the structure characterized in that it has a surface area of at least 2.7 $m^2/g$, a compressive strength of at least 31 MPa, a thermal expansion coefficient smaller than $5.2 \times 10^{-6}$ m/m/° C. over the temperature range 23°–800° C. and a porosity of at least 20%.

Another object of this invention is a method of preparing a catalyst support structure comprising:

(a) coprecipitating salts of aluminum, magnesium and silicon in a basic medium to provide a homogeneous mixture of said salts;

(b) treating the homogeneous mixture of salts to afford a dry mixture;

(c) passing a moldable mass comprising the dry mixture and a binder through a die to give a shaped article; and (d) heating the shaped article at a temperature and for a time sufficient to provide a ceramic article comprising a polycrystalline cordierite phase having a surface area of at least 2.7 $m^2/g$.

Accordingly, a specific embodiment comprises mixing an aqueous solution of aluminum nitrate, magnesium nitrate and tetraethylorthosilicate with a solution of ammonium hydroxide, thereby precipitating the hydroxide salts of aluminum, magnesium and silicon. The hydroxides are dried at a temperature of about 120° C. and then mixed with methylcellulose and water to form a moldable mass which is extruded through a die, thereby forming a monolithic honeycomb shape. The honeycomb shape is heated at a temperature of about 1200° C. for a time of about 5 hours to give a polycrystalline cordierite catalyst support structure having a surface area of at least 9 $m^2/g$.

Yet another embodiment of the invention is a method of preparing a monolithic honeycomb catalyst support structure comprising:

(a) reacting compounds of aluminum, magnesium and silicon with urea or hexamethylenetetraammine at a temperature and for a time sufficient to form a gel;

(b) treating the gel to provide a dry powder;

(c) passing a moldable mass comprising the dry powder and a binder through a die to give a shaped article; and (d) heating the shaped article at a temperature and for a time to provide a ceramic article comprising a polycrystalline cordierite phase having a surface area of at least 2.7 $m^2/g$.

A further embodiment of the invention is a method of preparing a catalyst support structure comprising:

(a) reacting compounds of aluminum, magnesium and silicon, the silicon compounds being tetraethylorthosilicate or tetramethylorthosilicate, at a temperature and for a time sufficient to form a gel;

(b) treating the gel to provide a dry powder;

(c) passing a moldable mass comprising the dry powder and a binder through a die to give a shaped article; and (d) heating the shaped article at a temperature and for a time to provide a ceramic article comprising a polycrystalline cordierite phase having a surface area of at least 2.7 $m^2/g$.

Still another embodiment of the invention is a catalytic composite comprising at least one catalytic metal dispersed on a support, wherein the improvement comprises a support comprising a substantially polycrystalline cordierite phase in the shape of a monolithic honeycomb having a chemical composition by weight of 6–15% MgO, 33–40% $Al_2O_3$ and 45–56% $SiO_2$, having a surface area of at least 2.7 $m^2/g$, a compressive strength of at least 31 MPa, a thermal expansion coefficient smaller than $5.2 \times 10^{-6}$ m/m/° C. over the temperature range of 23°–800° C. and a porosity of at least 20%.

A further embodiment of the invention is a method of treating waste gases comprising contacting the waste gases with the catalytic composite described above.

Other objects and embodiments will become more apparent in the following detailed description.

DETAILED DESCRIPTION OF THE INVENTION

As indicated, the present invention relates to a catalyst support structure, a method of preparing said structure and a use for said structure. The catalyst support structure comprises a substantially polycrystalline cordierite phase. The cordierite phase is composed of magnesium oxide, alumina and silicon oxide. The cordierite phase is not limited to one particular combination of magnesium, aluminum and silicon oxide, but extends over a wide compositional range. Accordingly, the chemical composition of the cordierite phase is within the following range (by weight) MgO 6–15%, $Al_2O_3$ 33–40% and $SiO_2$ 45–56%. The catalyst support structure of this invention is characterized in that it possesses a surface area of at least 2.7 $m^2/g$. Applicants are the first persons to manufacture a cordierite catalyst support structure having such a high surface area.

Another object of this invention is a method of preparing a catalyst support structure. The first step in this method of preparation is to coprecipitate salts of aluminum, magnesium and silicon in a basic medium to provide a homogeneous mixture of the salts. This is accomplished by mixing a solution containing compounds of magnesium, aluminum and silicon with a solution of a precipitating agent (which has a basic pH), thereby coprecipitating an intimate mixture of metals salts. The solution containing the magnesium, aluminum and silicon compounds may be an aqueous solution, may use an organic solvent or mixtures thereof. Illustrative of the organic solvents which maybe used are ethanol, methanol, and propanol with ethanol being preferred. The magnesium compounds which may be used are selected from the group consisting of magnesium chloride, magnesium nitrate, magnesium acetate, magnesium sulfate and magnesium bromide. Aluminum compounds which may be used are selected from the group consisting of aluminum nitrate, aluminum chloride, aluminum chlorohydrate, aluminum sulfate, aluminum bromide and aluminum butoxide. Finally the silicon compounds may be selected from the group consisting of tetraethylorthosilicate, sodium silicate, colloidal silica, and tetramethylorthosilicate.

A precipitating agent is now admixed with the metal compounds solution (giving a basic medium) in order to simultaneously precipitate (coprecipitate) insoluble salts of the metals. The precipitating agent may be selected from the group consisting of ammonium hydroxide, sodium hydroxide, potassium hydroxide, ammonium carbonate, ammonium bicarbonate, sodium carbonate and potassium carbonate. It is desirable to prepare a solution of the precipitating agent which solution may be formed by using water, an organic liquid or mixtures of the two as a solvent with water being preferred. It is not critical whether the solution of precipitating agent is added to the solution of metal compounds or vice versa, although it is preferred that the solution of metal compounds be added to the solution of precipitating agent. When the metal compound solution is added to the precipitating agent, it is also possible to use individual solutions of the three metal compounds which are simultaneously added to the solution of precipitating agent.

Finally, the concentration of the metal compounds in the solution may have to be varied from the ratio desired in the final product. This is owing to the fact that the precipitated salts are slightly soluble to varying degrees. For example, when the hydroxide salts are precipitated magnesium hydroxide is very slightly soluble necessitating the presence of larger amounts of the magnesium compounds, e.g. magnesium nitrate, than the ratio in the final product requires.

Once the precipitate is formed, it may be isolated by conventional methods such as vacuum filtration. The precipitate thus isolated may be washed with water to remove any impurities and then dried at a temperature of about 60° to about 130° C.

An alternate way of producing an intimate mixture of the three metal salts is to form a gel. Accordingly, solutions of compounds of the three metals may be allowed to gel by stirring at a temperature of about 20° C. to about 90° C. for a time from about 2 hours to about 5 days. In order to form a gel it is necessary that the silicon compound be tetraethylorthosilicate or tetramethylorthosilicate. Once the gel is formed, it is washed and dried at a temperature of about 60° to about 130° C., thereby forming a dry powder of the mixed salts.

Yet another method of preparing an intimate mixture of the three metal salts is to mix the metal compound solution with urea or hexamethylenetetraammine which are compounds that dissociate to form ammonia. The mixture of metal compounds and urea is stirred at a temperature of about 20° C. to about 100° C. for a time of about 1 hour to about 2 days. Once a gel is formed, it is washed with water and then dried at a temperature of about 60° C. to about 130° C., thereby forming a dry powder of the mixed metal salts.

Regardless of the method used to obtain the mixed metal salts, the next step in the method of preparing a catalyst support structure is to prepare a moldable mass which can be extruded through a die. A moldable mass may be prepared by mixing the mixed metal salts with a binder or plasticizing agent. Generally about 1–20 weight percent of the binding agent is adequate to form a moldable mass. The binding agent may be any agent well known in the art. Preferred agents are methyl cellulose, polyvinyl alcohol or a silicone resin. Up to about 1 percent by weight based upon the total body weight of a surfactant or lubricant such as sodium stearate, zinc stearate, magnesium stearate and stearic acid can also be used to facilitate mixing. The mixing step should be performed using a liquid, preferably water, which acts as a further binder or plasticizer. Conventional mixing equipment can be used to form the mixture into a moldable mass.

The moldable mass or batch can now be formed into a desired shape by conventional ceramic forming processes. Illustrative of these methods are pressing and extrusion. For example, the moldable mass may be passed through an extrusion die to form a honeycomb body. Such an extrusion die and process is presented in U.S. Pat. No. 4,747,986 which is incorporated herein by reference. The honeycomb body is characterized by a plurality of open cells with thin walls. The shape of the cells may be square, circular, rectangular, triangular, hexagonal, etc. Typically the honeycomb walls will have a thickness of between about 0.07 mm to about 1.3 mm with cell densities of between about 8 cells/cm$^2$ to about 140 cells/cm$^2$. Other methods of forming a honeycomb shape are injection molding and rolling and pressing of sheets which can be assembled into a honeycomb structure.

In an alternate method of preparing a moldable mass, the mixed metal salts may be converted to the metal oxides, cordierite or intermediate compounds which react to form cordierite prior to forming the moldable mass. This is accomplished by heating the metal salts at a temperature of about 600° C. to about 1425° C. for a time of about 1 to about 10 hours to obtain the mixed metal oxides. These oxides are then processed as described above.

Having obtained a desired shape, the next step in the process is to heat the shape and convert the individual metal oxides or intermediate components to the cordierite phase. This is accomplished by heating the honeycomb structure in air at a temperature of about 1150° to about 1450° C. for a time of about 1 to about 30 hours. This produces a catalyst structure which has a surface area of at least 2.7 m$^2$/g or more preferably 8 m$^2$/g, a compressive strength of about 31 MPa, a thermal expansion coefficient smaller than $5.2 \times 10^{-6}$ m/m/° C. over the temperature range 23° to 800° C. and a porosity of at least 20%. The average pore size determined by mercury porosimetry is in the range of about 50 to about 260 nm. The compressive strength is measured on a uniaxially pressed test bar prepared from the same material and heated under the same conditions as the catalyst support structure.

While cordierite is the major phase, the exact composition of the catalyst support is dependent on the heating temperature and time. Thus, materials with widely differing pore sizes, thermal expansion coefficients and strengths can be prepared from precursors with the same relative amounts of magnesium, aluminum and silicon.

Another embodiment of the invention comprises a catalytic composite comprising at least one catalytic metal dispersed on the catalyst support structure described above. Methods of dispersing metals on the support are well known in the art. One example of a method of depositing catalytic metals thereon is to impregnate the metals onto the catalyst support structure using a solution of the desired metal compound. The impregnated catalyst support structure is then dried and calcined forming a catalytic composite. Details of this method of depositing catalytic metals may be found in U.S. Pat. No. 4,760,044 which is incorporated herein by reference.

Finally, another embodiment of the invention is a method of treating waste gases with the catalytic composite described in the above paragraph. In order to more fully illustrate the instant invention, the following examples are set forth. It is to be understood that the examples are only by way of illustration and are not intended as an undue limitation on the broad scope of the invention as set forth in the appended claims.

EXAMPLE I

A 2M solution of magnesium nitrate was prepared by dissolving 87.22 g of Mg(NO$_3$)$_2$ .6H$_2$O in deionized water to give 170 mL of solution. A 4M solution of aluminum nitrate was prepared by dissolving 255.09 g of Al(NO$_3$)$_3$ .9H$_2$O in hot deionized water to give 170 mL of solution. A 2.4M solution of tetraethylorthosilicate (TEOS) was prepared by adding 177 g of TEOS to 170 mL of ethanol.

The three solutions described above were mixed in a beaker and diluted with 100 mL of ethanol. This solution was divided into two equal parts. One part was added dropwise to 1,000 mL of 2M NH$_4$OH. Vacuum filtration was used to isolate the precipitate from the ammonium hydroxide solution. The precipitate was washed with deionized water and dried at 120° C.

The precipitated material was ground using a mortar and pestle, pressed into a 2.86 cm diameter disk at 69 MPa (10,000 psi) and heated in air at 1200° C. for 1 hour. Mercury intrusion showed that the disk had a pore area of 9.5 m$^2$/g, a median pore diameter (based on pore volume) of 1267 nm and an average pore diameter of 55 nm. X-ray diffraction showed that the major crystalline phase present was cordierite, while minor amounts of mullite and spinel were also observed.

EXAMPLE II

A 2M solution of magnesium acetate was prepared by dissolving 72.92 g of Mg (C$_2$H$_3$O$_2$)$_2$ .4H$_2$O in deionized water to give 170 mL of solution. A 2M solution of aluminum nitrate was prepared by dissolving 255.09 g of Al(NO$_3$)$_3$ .9H$_2$O in hot deionized water to give 340 mL of solution. A 1.9M solution of TEOS was prepared by adding 177 g of TEOS to 250 mL of ethanol.

The above three solutions were mixed together and then added dropwise to 1,000 mL of 6M NH$_4$OH. After precipitation ammonium hydroxide was added to adjust the pH to greater than 10. The precipitate was then isolated by vacuum filtration and washed with 0.6M NH$_4$OH. After drying at 80° C., the precipitate was divided into three 30 g batches (Batch 1, Batch 2 and Batch 3).

Batch 1 was mixed with five weight percent Methocel TM 20-122 (Dow Chemical Co. brand of methyl cellulose). Disks were formed by uniaxially pressing approximately 1.75 grams of powder at 138 MPa. Samples were sintered at 1200° C., 1315° C., and 1430° C. for five hours in air. All sintering profiles included one hour holds at 700° C. and heating rates of 200° C./hr. Pore size distributions were measured by mercury porosimetry and thermal expansion coefficients were measured by dilatometry. Compressive strengths were measured on pieces 6.5 mm by 6.5 mm by 2.5 mm cut from the sintered disks. Results are summarized in Table A.

TABLE A

| Heating Temp. | Apparent[1] Porosity | Pore Area (m$^2$/g) | Median Pore Diameter* (microns) | Average Pore Diameter (microns) | Thermal Exp. Coefficient (m/m/°C.) | Compressive Strength (MPa) |
|---|---|---|---|---|---|---|
| 1200° C. | 24% | 3.1 | 2.1 | 0.17 | 4.4 × 10$^{-6}$ | 84.5 |
| 1315° C. | 24% | 3.7 | 2.3 | 0.16 | 1.2 × 10$^{-6}$ | 96.9 |
| 1430° C. | 24% | 1.6 | 2.5 | 0.35 | ~1.0 × 10$^{-6}$ | 102.2 |

*(Median pore diameter is based on volume.)

[1]Apparent Porosity = $\frac{\text{Theoretical Density} - \text{Actual Density}}{\text{Theoretical Density}}$ Batch 2 was calcined at 700° C. for 2 hours in air using a heating rate of 2° C./min. This cordierite precursor was amorphous as determined by x-ray powder diffraction. The calcined material was blended with five weight percent Methocel TM and uniaxially pressed into 1.125" diameter disks at 138 MPa. Samples were heated and tested as for Batch 1 and the results are presented in Table B.

TABLE B

| Heating Temp. | Apparent[1] Porosity | Pore Area (m$^2$/g) | Median Pore Diameter* (microns) | Average Pore Diameter (microns) | Thermal Exp. Coefficient (m/m/°C.) | Compressive Strength (MPa) |
|---|---|---|---|---|---|---|
| 1200° C. | 30% | 4.0 | 1.7 | 0.18 | 5.2 × 10$^{-6}$ | 39.4 |
| 1315° C. | 30% | — | — | — | 2.6 × 10$^{-6}$ | 31.7 |
| 1430° C. | 27% | 2.9 | 2.3 | 0.25 | 2.0 × 10$^{-6}$ | 53.5 |

*(Median pore diameter is based on volume)

[1]Apparent Porosity = $\frac{\text{Theoretical Density} - \text{Actual Density}}{\text{Theoretical Density}}$ Three grams of Batch 2 were uniaxially pressed at 139 MPa to form a 1.125" diameter disk. The disk was cut into two pieces. One piece was heated at 1200° C. in air for five hours using a heating rate of 200° C./hr and an intermediate one hour hold at 700° C. The other piece was heated at 1200° C. for one hour using a similar time-temperature profile. The porosity characteristics of these two pieces are summarized in Table C.

TABLE C

| Heating Temp. | Apparent[1] Porosity | Pore Area (m$^2$/g) | Median Pore Diameter* (microns) | Average Pore Diameter (microns) |
|---|---|---|---|---|
| 1200° C./5 hr | 28% | 11.0 | 1.2 | 0.056 |
| 1200° C./1 hr | 26% | 2.9 | 1.3 | 0.185 |

*(Median pore diameter is based on volume.)

[1]Apparent Porosity = $\frac{\text{Theoretical Density} - \text{Actual Density}}{\text{Theoretical Density}}$ Batch 3 was calcined at 1300° C. in air for two hours using a heating rate of 2° C./min to 700° C. and 3° C./min between 700° and 1300° C. The major phase was cordierite as determined by x-ray powder diffraction. Minor amounts of mullite and spinel were also observed. The calcined material was blended with five weight percent Methocel TM and uniaxially pressed into 1.125" disks at 138 MPa. Samples were heated at 1200°, 1315°, and 1430° C. for five hours in air. The samples heated at 1200° and 1315° C. exhibited little densification and were too fragile for further characterization. The characteristics of the sample heated at 1430° C. are summarized in Table D.

TABLE D

| Heating Temp. | Apparent[1] Porosity | Pore Area (m$^2$/g) | Median Pore Diameter* (microns) | Average Pore Diameter (microns) | Thermal Exp. Coefficient (m/m/°C.) | Compressive Strength (MPa) |
|---|---|---|---|---|---|---|
| 1430° C. | 31% | 3.6 | 4.1 | 0.068 | ~1.0 × 10$^{-6}$ | 79.2 |

*(Median pore diameter is based on volume.)

[1]Apparent Porosity = $\frac{\text{Theoretical Density} - \text{Actual Density}}{\text{Theoretical Density}}$

EXAMPLE III

Solutions of magnesium acetate, aluminum nitrate and tetraethylorthosilicate were prepared as in Example II. These solutions were mixed in a container and 250 mL of ethanol were added. This mixture was allowed to stand at room temperature for one day and then heated at 80° C. overnight, thereby forming a gel. The gel was dried at 110° C. and then ground into a powder. Disks (1.125 inches in diameter) were formed by uniaxially pressing and then heated in air at a rate of 3° C./min. up to 700° C., held there for one hour and then heated at a rate of 3° C./min. up to 1200° C. and held there for ten hours. The disks were cooled and ground to provide particulate of a size between 40 and 20 mesh (425 to 850 microns).

A portion of the above particulate support (8.5 g) was impregnated by placing the support in a rotary evaporator and adding to it 25 mL of an aqueous solution containing 6 mg of rhodium as rhodium chloride and 31 mg of platinum as chloroplatinic acid. The impregnated support was dried and then heated in air at 600° C. for six hours.

One gram of the above catalyst was placed in a reactor which in turn was placed in a vertical furnace over which the gases in Table 1 were flowed. The gas mixtures simulate exhaust from an automotive engine oscillating about the stoichiometric point.

TABLE 1

| Laboratory Gas Composition | | |
| --- | --- | --- |
| Gas Component | Lean Gas (ppm) | Rich Gas (ppm) |
| $O_2$ | 6500 | 2790 |
| CO | 3550 | 8000 |
| $H_2$ | 1183 | 2667 |
| $C_3H_8$ | 355 | 800 |
| $C_3H_6$ | 500 | 500 |
| NO | 1835 | 1835 |
| $CO_2$ | 118800 | 118800 |
| $SO_2$ | 20 | 20 |
| $H_2O$ | 10 vol. % | 10 vol. % |
| $N_2$ | Balance | Balance |

The lean and rich gas mixtures were oscillated at a frequency of 0.5 Hertz.

The catalyst was tested by heating the catalyst to 600° C. while passing the above oscillating gas over the catalyst. The gas stream at the inlet and outlet of the reactor was analyzed and a conversion efficiency calculated for carbon monoxide, hydrocarbon and nitric oxide. The temperature at which these conversions reached 25, 50 and 75% are presented in Table 2.

TABLE 2

| Activity of Catalyst Prepared According to the Invention | | | |
| --- | --- | --- | --- |
| Component | T25* | T50* | T75* |
| HC | 265 | 277 | 291 |
| CO | 285 | 302 | 448 |
| $NO_x$ | 266 | 282 | 307 |

*Temperature required to reach stated conversion.

As Table 2 shows, the instant catalyst is capable of converting pollutants found in an automotive exhaust to innocuous compounds.

We claim as our invention:

1. A catalyst support structure consisting essentially of a substantially polycrystalline cordierite phase having a chemical composition by weight of 6–15% MgO, 33–40% $Al_2O_3$ and 45–56% $SiO_2$, the structure characterized in that it has a surface area of at least 2.7 $m^2/g$, a compressive strength of at least 31 MPa, a thermal expansion coefficient smaller than $5.2 \times 10^{-6}$ m/m/° C. over the temperature range 23°–800° C. and a porosity of at least 20%.

2. The ceramic article of claim 1 where the article is in the shape of a monolithic honeycomb.

3. The catalyst support structure of claim 1 further characterized in that it has a surface area of at least 8 $m^2/g$.

4. The catalyst support structure of claim 1 where the cordierite phase has a chemical composition of 13.8% MgO, 34.9% $Al_2O_3$, and 51.3% $SiO_2$.

5. A method of preparing a catalyst support structure consisting essentially of:
   (a) coprecipitating salts of aluminum, magnesium and silicon in a basic medium to provide a homogeneous mixture of said salts;
   (b) treating the homogeneous mixture of salts to afford a dry mixture;
   (c) passing a moldable mass comprising the dry mixture and a binder through a die to give a shaped article; and
   (d) heating the shaped article at a temperature and for a time sufficient to provide a catalyst support structure comprising a polycrystalline cordierite phase having a surface area of at least 2.7 $m^2/g$.

6. The method of claim 5 further characterized in that the dry mixture is calcined at a temperature of about 600° to about 1425° C. for a time of about 1 to about 10 hours.

7. The method of claim 5 where the aluminum compound is selected from the group consisting of aluminum nitrate, aluminum chloride, aluminum chlorohydrate, aluminum sulfate, aluminum bromide, and aluminum butoxide.

8. The method of claim 5, where the magnesium compound is selected from the group consisting of magnesium chloride, magnesium nitrate, magnesium acetate, magnesium sulfate and magnesium bromide.

9. The method of claim 5 where the silicon compound is selected from the group consisting of tetraethylorthosilicate, sodium silicate, colloidal silica and tetramethylorthosilicate.

10. The method of claim 5 where the basic medium is selected from the group consisting of ammonium hydroxide, sodium hydroxide, potassium hydroxide, ammonium carbonate, ammonium bicarbonate, sodium carbonate and potassium carbonate.

11. The method of claim 5 where the binder is selected from the group consisting of methylcellulose, and polyvinyl alcohol and is present in an amount from about 1 to about 20 weight percent.

12. The method of claim 5 where the heating is carried out at a temperature of about 1150° to about 1450° C. and for a time from about 1 to about 30 hours.

13. A method of preparing a catalyst support structure comprising:
   (a) reacting compounds of aluminum, magnesium and silicon with urea or hexamethylenetetraammine at a temperature and for a time sufficient to form a gel;
   (b) treating the gel to provide a dry powder;
   (c) passing a moldable mass comprising the dry powder and a binder through a die to give a shaped article; and
   (d) heating the shaped article at a temperature and for a time to provide a catalyst support structure consisting essentially of a polycrystalline cordierite phase having a surface area of at least 2.7 $m^2/g$.

14. The method of claim 13 further characterized in that the dry powder is calcined at a temperature of about 600° to about 1425° C. for a time of about 1 to about 10 hours.

15. The method of claim 13 where the aluminum compound is selected from the group consisting of aluminum nitrate, aluminum chloride, aluminum chlorohydrate, aluminum sulfate, aluminum bromide, and aluminum butoxide.

16. The method of claim 13 where the magnesium compound is selected from the group consisting of magnesium chloride, magnesium nitrate, magnesium acetate, magnesium sulfate and magnesium bromide.

17. The method of claim 13 where the silicon compound is selected from the group consisting of tetraethylorthosilicate, sodium silicate, colloidal silica and tetramethylorthosilicate.

18. The method of claim 13 where the binder is selected from the group consisting of methylcellulose, and polyvinyl alcohol and is present in an amount from about 1 to about 20 weight percent.

19. The method of claim 13 where the heating is carried out at a temperature of about 1150° to about 1450° C. and for a time from about 1 to about 30 hours.

20. A method of preparing a catalyst support structure comprising:
(a) reacting compounds of aluminum, magnesium and silicon, the silicon compounds being tetraethylorthosilicate or tetramethylorthosilicate, at a temperature and for a time sufficient to form a gel;
(b) treating the gel to provide a dry powder;
(c) passing a moldable mass comprising the dry powder and a binder through a die to give a shaped article; and
(d) heating the shaped article at a temperature and for a time to provide a ceramic article consisting essentially of a polycrystalline cordierite phase having a surface area of at least 2.7 $m^2/g$.

21. The method of claim 20 further characterized in that the dry powder is calcined at a temperature of about 600° to about 1425° C. for a time of about 1 to about 10 hours.

22. The method of claim 20 where the aluminum compound is selected from the group consisting of aluminum nitrate, aluminum chloride, aluminum chlorohydrate, aluminum sulfate, aluminum bromide, and aluminum butoxide.

23. The method of claim 20 where the magnesium compound is selected from the group consisting of magnesium chloride, magnesium nitrate, magnesium acetate, magnesium sulfate and magnesium bromide.

24. The method of claim 20 where the binder is selected from the group consisting of methylcellulose, and polyvinyl alcohol and is present in an amount from about 1 to about 20 weight percent.

25. The method of claim 20 where the heating is carried out at a temperature of about 1150° to about 1450° C. and for a time from about 1 to about 30 hours.

26. In a catalytic composite comprising at least one catalytic metal dispersed on a support, wherein the improvement comprises a support consisting essentially of a substantially polycrystalline cordierite phase having a chemical composition by weight of 6–15% MgO, 33–40% $Al_2O_3$ and 45–56% $SiO_2$, having a surface area of at least 2.7 $m^2/g$, a compressive strength of at least 31 MPa, a thermal expansion coefficient smaller than $5.2 \times 10^{-6}$ m/m/° C. over the temperature range of 23°–800° C. and a porosity of at least 20%.

* * * * *

UNITED STATES PATENT AND TRADEMARK OFFICE
CERTIFICATE OF CORRECTION

PATENT NO. : 4,956,329
DATED : September 11, 1990
INVENTOR(S) : Chao et al.

It is certified that error appears in the above-identified patent and that said Letters Patent is hereby corrected as shown below:

Column 6, line 40: "$Mg(NO_3)_2.6H_2O$" should read --$Mg(NO_3)_2 \cdot 6H_2O$--
        line 43: "$Al(NO_3)_3.9H_2O$" should read --$Al(NO_3)_3 \cdot 9H_2O$--
        line 66: "$Mg(C_2H_3O_2)_2.4H_2O$" should read --$Mg(C_2H_3O_2)_2 \cdot 4H_2O$--
Column 7, line 1: "$Al(NO_3)_3.9H_2O$" should read --$Al(NO_3)_3 \cdot 9H_2O$--
Column 10, line 16: delete "comprising" and substitute
        --consisting essentially of--

Signed and Sealed this

Twenty-seventh Day of April, 1993

Attest:

MICHAEL K. KIRK

Attesting Officer      Acting Commissioner of Patents and Trademarks